May 21, 1946.  E. G. GAGE  2,400,750
SAFETY FILTER CONDENSER FOR OPERATION
OF CATHODE RAY TUBES AND THE LIKE
Filed Jan. 7, 1944  2 Sheets-Sheet 1
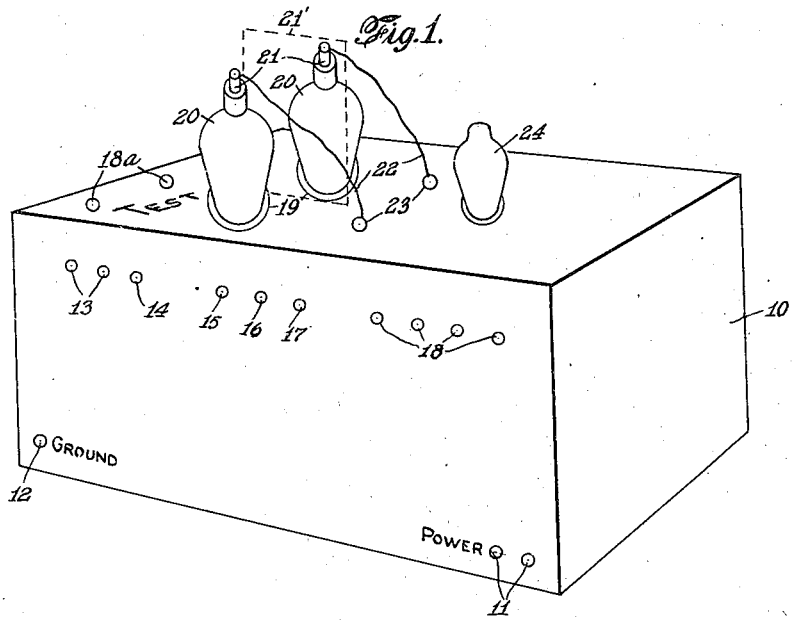
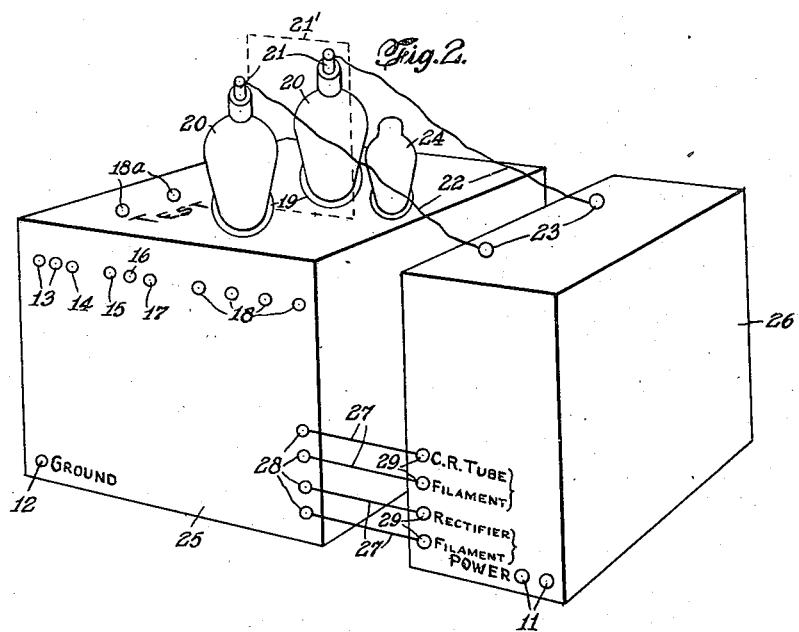
INVENTOR.
EDWARD G. GAGE
BY
ATTORNEY.

May 21, 1946.    E. G. GAGE    2,400,750
SAFETY FILTER CONDENSER FOR OPERATION
OF CATHODE RAY TUBES AND THE LIKE
Filed Jan. 7, 1944    2 Sheets-Sheet 2
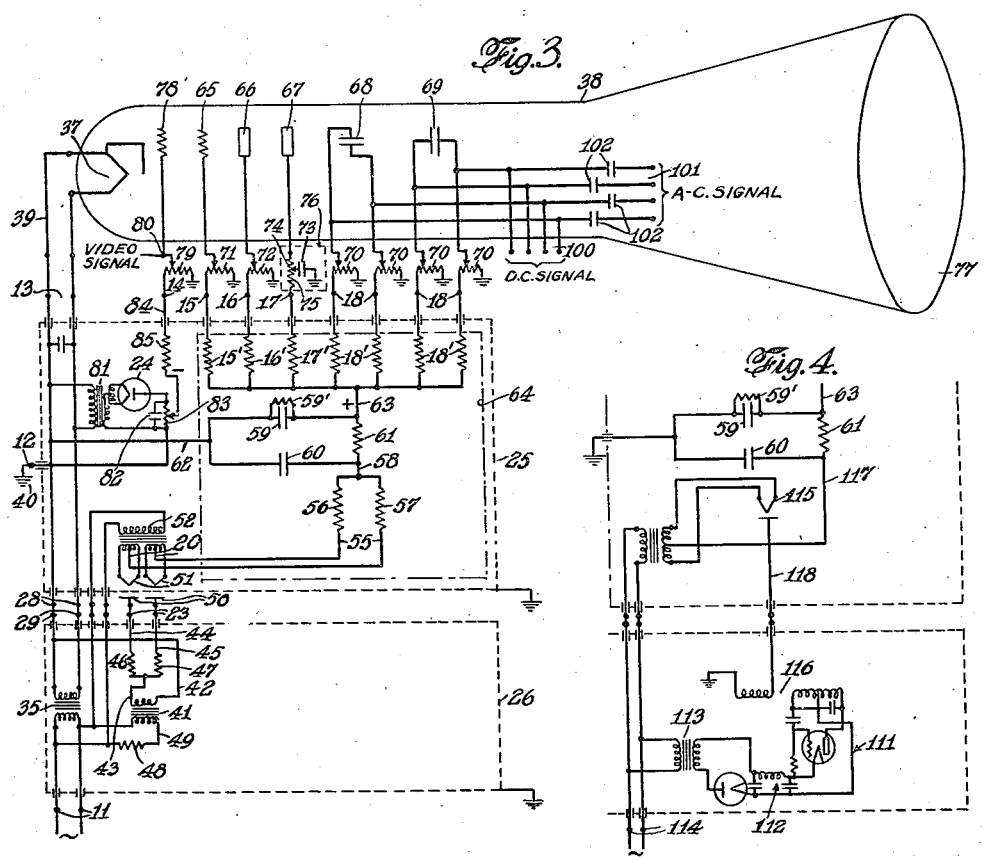
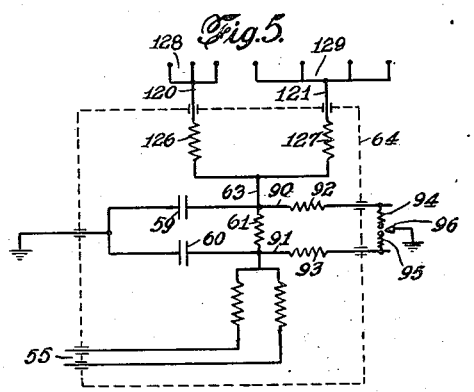
INVENTOR.
EDWARD G. GAGE
BY
ATTORNEY.

Patented May 21, 1946

2,400,750

UNITED STATES PATENT OFFICE 2,400,750

SAFETY FILTER CONDENSER FOR OPERATION OF CATHODE-RAY TUBES AND THE LIKE

Edward G. Gage, Brooklyn, N. Y., assignor of two-thirds to Leon Ottinger, New York, N. Y.

Application January 7, 1944, Serial No. 517,336

18 Claims. (Cl. 315—29)

The invention relates to high potential filter condensers, more especially such as are utilized in connection with the operation of cathode ray tubes, luminescent or fluorescent tubes, X-ray apparatus, and similar devices utilizing voltages and current of such magnitude as normally to be considered dangerous. These voltages constitute a hazard not only for those who may be required to service the apparatus, but also in some instances to those operating the same.

It has heretofore been the practice to energize the elements of these high potential unilateral apparatus directly from a common source such as a bleeder circuit which necessitated the use of a dangerous input and output current, respectively into and from the bleeder circuit.

In various United States Letters Patent already granted me, I have indicated means whereby high potential circuits of this nature are rendered safe, that is to say, in case of contact therewith by a person, the most serious effect of such contact would be a more or less uncomfortable jolt. In such arrangement, more especially in connection with the operation of unilateral electrical apparatus requiring a relatively large current, at the dangerous voltages utilized with this type of apparatus, a plurality of condensers and rectifiers are necessary as well as a multiplicity of input and output circuits.

It is an object of the present invention to reduce materially, in thus safeguarding the power unit, the number of such devices required and to simplify thereby also the circuit arrangement.

A further object of the invention is to provide a simple and compact power unit wherein all accessible terminals thereof are safe to contact, the unit providing ample current for the different elements of the apparatus to be operated therefrom and at a nominally dangerous voltage.

A still further object of the invention is to provide a combined condenser and charging rectifier assembly.

The invention has for an object, also, to provide a novel multisection condenser assembly which will be safe to handle.

Another object of the invention is to provide simple, convenient, and safe test facilities for the input and output circuits of the condenser assembly.

Still another object of the invention is to provide a novel combination of power unit with cathode ray tube whereby the unit affords safe polarizing voltages for the deflectors of the tube for operating the latter by the application of either alternating or direct current signal voltages.

A still further object of the invention is to provide, with respect to the rectifying means of the power unit, inherent shielding of its cathodic element.

The invention has for an object, also, to provide for safely eliminating the effect of parasitic impulses in a connection from the power unit to an element of the tube particularly when the connection is comparatively long.

Another object of the invention is to provide means for rendering the cathode element of the cathode ray tube and/or return lead from the power unit safe for personal contact.

In carrying out the invention, the novel condenser is designed to be housed in a protective casing, together with the rectifying means of the input circuit thereto, so as to prevent contact of the human body with dangerous portions of this assembly. All of the capacitance required is combined in a single unit and this may be of the multisection type. In accordance with the invention, a separate input circuit, which includes current rectifying means, is connected to one of the sections of a filter condenser and an output circuit is connected to another section thereof.

The output circuit includes a plurality of branches connected in parallel with one another, which branches extend through the casing to suitable terminals thereon. In each branch and within the casing, there is included current limiting means such as series-connected resistors, the same being of an order of magnitude sufficiently low to allow the required current to pass for operation of the high potential apparatus and sufficiently high to limit at the terminals, upon bodily contact with circuits exteriorly of the casing, the current flow to a harmless value through a particular branch contacted and the body. Similar protective current limiting means may also be included in the input circuit; and/or asymmetric devices may be included in this circuit so polarized as to prevent return flow of current from the condenser in case of bodily contact with the input circuit exteriorly of the casing.

The nature of the invention, however, will best be understood when described in connection with the accompanying drawings, in which:

Fig. 1 is a view, in perspective, of the novel power unit; and Fig. 2 is a similar view illustrating a modification.

Fig. 3 is a diagrammatic view illustrating the circuit connections and arrangement of casings, more especially of the modified form of the unit shown in Fig. 2.

Fig. 4 is a fragmentary diagrammatic view illustrating the arrangement in connection with a high frequency source of power.

Fig. 5 is a fragmentary diagrammatic view illustrating a modification in the arrangement of the output circuits.

Referring to the drawings, more particularly Fig. 1 thereof, 10 designates a casing of suitable construction either of insulating material or of metal, in the former instance the supporting metal chassis being grounded and in the latter instance the casing being grounded. There is to be retained in the casing 10 the novel condenser unit, suitable rectifying means, transformers, and current limiting means and the electrical connections among the same, said casing serving to protect the various members and to prevent access or contact of the human body with dangerous portions of this assembly. Suitable terminals and those for which provision has been made to render the same safe are accessible and are provided on the exterior of the casing. Thus, power terminals 11 of a suitable source of low frequency supply, such as the usual 110-volt, 60-cycle alternating current, and a terminal 12 for a ground connection are provided, as indicated, on the front face of the casing 10. It is understood that a higher frequency supply, such as 500 cycles, is also suitable and permits the use of a smaller filter condenser unit. In addition, other terminals are provided on this face for the power connections to the particular high potential apparatus to be operated from the power unit. In the embodiment of high potential apparatus herein illustrated, viz.: a cathode ray tube, the casing is to be provided with terminals 13 for heating the cathode of such tube; the terminal 14 for the control grid; the terminal 15 for the screen grid; the terminals 16 and 17 for the first anode and the second anode; and the terminals 18 for the two sets of deflector plates thereof.

Further terminals are provided, for example, on the top of the casing, a pair 18ª being intended for testing the condenser, and it is to be understood that the ground terminal 12 may be used in combination with these test terminals.

The top is also provided with openings 19 designed to receive rectifier tubes 20, the anodes of which are energized through the removable insulated caps 21 of the tubes and flexible insulated leads 22 connected to terminals 23 provided on the top of the casing. By insulating the anode caps, accidental contact with more than one rectifier anode at a time is prevented. To further insure against simultaneous contact with more than one anode, a barrier insulation plate 21' or the like may be mounted between the two tubes. Alternatively, the rectifier tubes may be countersunk in the casing, such as in mounting the same on the bottom thereof, having the anode cap below the level of the top to thereby form a barrier between the two anodes. A further small rectifier tube 24 may extend through the top of the casing 10 for optional use in providing a seperate bias for the control grid of the cathode ray tube.

In some instances, depending upon the design of the cabinet housing the apparatus, it may be desirable to divide the power unit into two portions, as indicated, for example, in Fig. 2 of the drawings. As therein shown, one portion 25 may then contain the novel condenser unit with rectifiers and protective resistors, and the other portion 26, merely certain of the power-supplying transformers with further current limiting means, as is shown more particularly in the diagrammatic view of this embodiment, Fig. 3 of the drawings. Suitable connectors 27 between sets of terminals 28 of the casing 25 and terminals 29 of the casing 26 may be provided then to convey the power from the one casing to the other. The terminals 23 for rectifiers 20 may be provided on casing 26, as well as the power terminals 11.

Referring to Fig. 3 of the drawings, it will be noted that the casing 26 retains merely two transformers—a transformer 35 for supplying power to the cathode 37 of the cathode ray tube 38, the one or return lead 39 being grounded as at 40. Either a metallic return circuit or a ground return may be used. The primary of a second transformer 41 connected with the terminals 11 is mounted in this casing, and this transformer may be of the magnetic-leakage type to roughly limit the secondary current, for example, to deliver not more than twice the current required by the apparatus to be operated at the optimum secondary voltage. This current limitation may also be secured by the use of a high resistance secondary, as disclosed in my U. S. Letters Patent #2,319,594. These initial limitations, while preventing currents of a possible fatal value, do not provide for comfortable servicing conditions, and therefore use is made of the principle of multiple-path operation disclosed in my U. S. Letters Patent #2,283,728. As indicated, the one secondary lead 42 is grounded through connection with the lead 39, and its other lead 43 is divided into two branches 44 and 45 having connected in series therewith respective resistors 46 and 47, of substantially equal value and of an order of magnitude sufficiently low to provide the necessary current through each branch and sufficiently high to limit, upon bodily contact with a lead beyond the respective resistors, the current flow to a harmless value through said lead portion and the body of the person making contact therewith. The resistance of the transformer secondary should be approximately one-half of the total resistance of the two protective resistors 44 and 45. A limiting resistor 48 of comparatively low order of magnitude is included in the one lead 49 of the primary circuit of transformer 41 as an additional safeguard for over-all power limitation.

The safeguarded portions of the branches or leads 44 and 45 extend through the casing 26 to the terminals 23 from which they are connected to the anodes 50 of the rectifiers 20. The cathodes 51 of these rectifiers are energized from a transformer 52 located within the casing 25, the primary of which transformer receives its power from the terminals 11. The rectified current forms the divided input circuit leads 55 having the protective resistors 56 and 57 included in series in its branches in accordance with the arrangement shown in my prior U. S. Letters Patent #2,281,571, so that either branch is safe or comfortable individually (being limited to 5 milliamperes each on short-circuit and less on bodily contact) in case of bodily contact, and an uncomfortable effect (the result of 10 milliamperes) is had only in case both are contacted simultaneously. The circuit beyond the same is recombined and connected, as at 58, to a filter condenser, preferably of a plurality of sections, in the present instance the two sections 59 and 60 with the intermediate filtering resistor 61. One of these condensers, for example, the condenser 59, is shunted by a high resistance leak 59', for example, 10 megohms. One lead 62 from this condenser unit is grounded or returned to transformer 41, for example, by being connected to the return lead 39 from the cathode 37, and the other lead 63 includes a plurality of branches connected in parallel with one another, each branch being provided with a corresponding protective resistor 15', 16', 17' and 18' before the branches pass out of the casing 25 to the respective terminals 15, 16, 17 and 18.

Preferably, a secondary removably-mounted casing 64 of metal or heavy insulation material is provided within casing 25 to contain the condenser unit 59, 60, 61 with a portion of the input circuit therefor and resistors 56, 57 thereof and a portion of the output leads including the branches and their respective protective resistors. It may be desirable, also, to fill such casing with high voltage insulating compound and preferably to ground the metal case.

In the present embodiment, the terminals 15, 16, 17 and 18 are connected respectively to the screen grid 65 of the cathode ray tube, the first and second anodes 66 and 67 thereof, and the horizontal set of deflector plates 68 and the vertical set of plates 69 of said tube. Intermediate potentiometers 70 are included in the connections between the corresponding terminals 18 and the sets of deflectors 68 and 69 and similar potentiometers 71 and 72 between the screen grid 65, the first anode 66, and the respective terminals 16 and 17. In the case of the second anode 67, a by-pass condenser 73 may be provided which, together with protective resistors 74 and 75 located in series in the connection between the terminal 17 and said second anode 67, is confined within a casing 76 to prevent access to dangerous portions of the by-pass circuit. The former resistor 74 may be omitted if proper precautions are taken to shield completely, by the condenser casing 76, the anode terminal from possible contact with the body. The resistor 75 in the input circuit of the by-pass condenser may be of approximately the same value as the associated protective resistor 17'. The reason for the low resistance or absence of protective resistor in the by-pass output circuit immediately adjacent the anode terminal, is to allow a heavy transient surge of current to pass from the storage by-pass condenser 73 to the anode 67 if, in the operation of the tube, the beam should require a high instantanetous value. The purpose of this by-pass filter condenser is to smooth out any parasitic impulses which may develop in the anode branch from terminal 17 when such branch is unusually long, which impulses might otherwise interfere with attaining a sharp focus of the beam spot on the tube screen 77. The first anode may be similarly by-passed.

A novel biasing arrangement is indicated for the control grid 78 which has included in its connection between the terminal 14 and said grid a potentiometer 79, the video modulating output lead 80 being connected to the control grid at the movable point of the potentiometer 79. The said biasing arrangement includes a rectifier 24, preferably of the thermionic type, whose cathode is energized from a transformer 81 having its primary connected with the power supply for cathode 37 and its secondary supplying less than 300 volts. The output of the rectifier 24 is connected across a filter condenser 82 and shunted by a variable resistance 83 with negative terminal connected to the control grid 78 through the lead 84. The aforesaid variable resistance, together with a high resistance 85, for example 2 megohms, is connected in series in the lead 84 between the ground 40 and the control grid 78 and both are conveniently included in casing 25.

The use of a separate rectifier and filter circuit for the variable negative bias of the control grid is provided because of the fact that the usual method of obtaining this negative bias by a resistor in the cathode lead prevents the direct grounding of the cathode. Consequently, if the biasing resistor becomes defective or is interrupted, the full voltage of the bias source, which might be either the sound amplifier voltage of 300 volts, for example, of a television set, or the anode voltage thereof of between 1,000 and 10,000 volts, is available upon contact by the body. It is therefore extremely undesirable to mix the bias voltage with sources of high voltage. The large by-pass condenser which is used ordinarily across the bias resistor becomes an additional source of danger when charged to 300 volts or more.

It is, of course, understood that this negative bias source for the control grid may be obtained from dry cells, if desirable.

It is to be noted that even if a lead of the heating circuit to the cathode ray tube should have become interrupted, no harm would result from bodily contact with the cathode return lead, as this condition places the high impedance of the tube in series with the body and only a current of 2 or 3 milliamperes at most can pass. In addition to this, the tube impedance is immediately increased due to the fact that the heating of the cathode is interrupted.

If desired, test leads 90 and 91, Fig. 5, may be taken across the filtering resistor 61 of the condenser unit, with corresponding protective resistors 92 and 93 included in series therein. In this arrangement, it is desirable to provide for cutting out the high resistance shunt across the one condenser section (resistor 59'). As indicated, the resistor is connected across the test leads 90 and 91 but is in two portions 94 and 95 designed to be alternatively interrupted or connected by a grounded plug 96. The latter is to be withdrawn to interrupt this normally bridging resistance when tests are to be made through the leads 90 and 91.

The combined polarizing and beam-spot centering voltages applied to the sets of deflectors 68 and 69 in the manner hereinbefore indicated allow of providing for a set of terminals 100 for the application of direct current signal voltages, which terminals are safe to contact. These terminals are in addition to the usual terminals 101 for the application of alternating current signal voltages and are to be connected directly with the respective polarized deflectors 68 and 69, but between the latter and the condensers 102 generally provided in the said leads for A. C. operation.

When a high or radio frequency source of current supply having a frequency, for example, of 100 kc. is utilized, reference being had to Fig. 4 of the drawings, the condenser charging voltage may be derived from a suitable radio frequency oscillator circuit as indicated at 111, its plate circuit being energized by a high voltage filter circuit 112 deriving its power from a transformer 113 connected to the terminals 114 of a suitable source of supply such as 110-volt, 60-cycle alternating current, as in the previously described embodiment. A single rectifier 115 only is required in this arrangement, being energized from the secondary of the high frequency transformer 116, and delivers current at the required high voltage to the multisection filter condenser unit 59, 60, 61, having the output circuit lead 63.

Owing to the fact that the voltage from the radio frequency transformer 116 is harmless with the exception of possible burning effects upon contact with the output circuit therefrom, no additional protective resistor is required (except to reduce the burning effect) as in the case of the previously described embodiment. The output circuit of the filter condenser 59, 60, 61 including lead 63, however, remains dangerous for the higher frequency regardless of the size of the condenser, which may be smaller for ripple frequency purposes. This is because lead 63 must carry sufficient current to supply not only all of the high voltage elements supplied by the branches of the lead 63, but because there must also be a reserve supply of the current, usually about fifty per cent, to take care of all possible fluctuations of the high voltage power draining elements of the cathode ray tube. This reserve current is provided for, in the case of the low frequency embodiment previously described, by the use of a filter condenser having a larger capacity than commonly employed, for example, 0.3 mfd. for each section. The condensers of the high frequency filter are ordinarily sufficient for filtering purposes if they are approximately 0.005 mfd. each, but this capacity does not supply the required reserve current. Therefore, it is desirable even with the high voltage, high frequency supply to the anode to utilize the larger capacity filter condenser, the output of which must be safeguarded as hereinbefore described, and the capacity of which may be as large as 2 mfd., if desired, and still be safe to handle.

The use of this larger capacity provides not only a reserve supply of power for fluctuations of the cathode ray tube power draining elements, but also acts as a superior ripple filter and a scratch filter for eliminating, in the sound channels of a television receiver, the masking voltages or "noise" set up by the intermittent disintegration of the insulation surrounding the high voltage corona of the high frequency transformer secondary and its associated conductors, which noise is otherwise troublesome in that it mars both audio and video reception.

A 500-cycle source of supply from a motor generator or thermionic oscillator may also be used, in which case the transformer secondary becomes dangerous and should be protected. A smaller capacity such, for example, as .03 mfd. per section, is then sufficient for filtering purposes and is not particularly dangerous to contact, but here again it is necessary to provide a reserve supply of current to allow for fluctuations in the operation of the tube. It is, therefore, more advantageous to provide for this by increasing the capacity of the filter condensers than by increasing the power of the transformer.

With respect to the input circuit lead 117, this is dangerous in case of bodily contact, being connected directly to the cathode of the rectifier. To render the same safe, the usual socket which retains the cathode terminals is to be depressed by being mounted within the casing 25, so that when the rectifier tube 20 is inserted in the socket, such terminals are inaccessible and when the rectifier is removed there is no charging current available from the high voltage transformer 16 and the residual discharge of the condenser will rapidly leak off through resistor 59' before contact with the terminals is possible. The anode lead 118 of the rectifier may be safely contacted since a discharge from the condenser cannot flow back through the body upon contact therewith owing to the asymmetrical property of the rectifier.

A further modification in the circuit arrangement is indicated in Fig. 5 of the drawings, this embodiment being particularly adapted for low-power cathode ray tube apparatus. As indicated, the output circuit lead 63 from the condenser unit is divided in this instance into but two branches 120 and 121 in each of which branches is included protective resistors 126 and 127, respectively, the resistance of these resistors being somewhat less than that in the case of the greater subdivision shown in Fig. 3, so that the portion of branches 120 and 121 extending beyond the secondary casing 64 will be safe to contact. As an example of values for these resistors 126 and 127, where the charging voltage is approximately 3,000 volts, these resistors may be of the order of magnitude of approximately one-half megohm each, whereas in the embodiment of Fig. 3, utilizing the same charging voltage, each resistor would have a value approximately four times that of a resistor 126 or 127, or 2 megohms. It is, of course, understood that the resistance of the associated potentiometers is preferably greater than that of the said protective resistors. In the case of the filter-resistors and the input circuit resistors, these must be of a lower value than the aforesaid output protective resistors.

Each branch, furthermore, is divided into a plurality of sub-branches, the branch 120, for example, being divided into three branches 128 for connection respectively to the screen grid 65, first anode 66 and second anode 67, while the branch 121 is divided into four sub-branches 129 for connection respectively to the two sets of deflector elements 68 and 69 of the cathode ray tube.

I claim:

1. High potential filter condenser unit for cathode ray tubes, comprising a protective casing for the unit to prevent contact of the human body therewith, said unit including a condenser affording nominally dangerous current and voltage values, separate input and output circuits to and from the condenser adapted respectively for charging the condenser and for operating elements of the cathode ray tube, one lead of the output circuit including a plurality of branches connected in parallel with one another, extending through the casing and each providing a nominally dangerous voltage, and current limiting means located within the casing included in series in the respective parallel-connected branches, said current limiting means being of an order of magnitude sufficiently low to permit optimum operation of the cathode ray tube and sufficiently high to limit, upon bodily contact with a branch exteriorly of the casing, the current flow to a harmless value through said branch and body due to the resulting voltage drop.

2. The high potential filter condenser unit of claim 1, wherein one lead of the input circuit includes a plurality of branches connected in parallel with one another, and in each branch there is included in series a current limiting means located within the casing and of an order of magnitude sufficiently low to permit optimum operation of the cathode ray tube and sufficiently high to limit, upon bodily contact with a branch exteriorly of the casing, the current flow to a harmless value through said branch and body due to the resulting voltage drop.

3. The high potential filter condenser unit of claim 1, wherein the current limiting means are resistors.

4. The high potential filter condenser unit of claim 1, wherein the branches exteriorly of the casing are subdivided.

5. The high potential filter condenser unit of claim 1, wherein the branches exteriorly of the casing are subdivided, one division energizing the anodes of the cathode ray tube and another polarizing the deflectors thereof.

6. The high potential filter condenser unit of claim 1, wherein the condenser comprises a plurality of filter sections, the input circuit being connected to one of the sections and the output circuit to another.

7. The high potential filter condenser unit of claim 1, wherein a test circuit is connected to the condenser and extends exteriorly of the casing, and current limiting means are included in the test circuit.

8. The high potential filter condenser unit of claim 1, wherein a potentiometer is connected in series in a branch to an element of the cathode ray tube.

9. The high potential filter condenser unit of claim 1, wherein a by-pass condenser is connected in shunt with a branch to an element of the cathode ray tube and in close proximity thereto.

10. The high potential filter condenser unit of claim 1, wherein a by-pass condenser is connected in shunt with a branch to an element of the cathode ray tube and in close proximity thereto and separate input and output current limiting means are connected to the condenser, and a protective casing is provided enclosing the condenser and the current limiting means.

11. The high potential filter condenser unit of claim 1, wherein the input circuit includes current rectifying means for charging the condenser.

12. The high potential filter condenser unit of claim 1, wherein the input circuit includes rectifying means for charging the condenser, together with current limiting means between the condenser and said rectifying means, said current limiting means being of an order of magnitude sufficiently low for optimum operation of the cathode ray tube and sufficiently high to limit, upon bodily contact with the input circuit exteriorly of the casing, the current flow to a harmless value through said input circuit and body due to the resulting voltage drop.

13. The high potential filter condenser unit of claim 1, wherein the input circuit includes rectifying means for charging the condenser, and shielding means are provided for the cathode portion of said rectifying means to prevent bodily contact therewith.

14. The high potential filter condenser unit of claim 1, wherein the input circuit includes rectifying means for charging the condenser, the same being in the nature of an electronic tube removably mounted in the casing and extending therethrough.

15. The combination with a high potential filter condenser unit and a cathode ray tube having its deflectors polarized therefrom, of direct current signal input terminals for said deflectors connected thereto and to the condenser unit, current limiting means included in the respective connections between said condenser unit and said signal input terminals to limit upon bodily contact with a connection, beyond a limiting means, the current flow to a harmless value through said connection and body, and a protective casing for the condenser unit and within which the said current limiting means are located.

16. The high potential filter condenser unit of claim 1, wherein the deflectors of the cathode ray tube are polarized therefrom and are connected to direct current signal input terminals, and protective resistors are included in the connections between said condenser unit and said direct current signal input terminals.

17. The high potential filter condenser unit of claim 1, wherein the deflectors of the cathode ray tube are polarized therefrom and are connected to alternating current input leads including respective series condensers, and additional signal input leads for direct current are respectively connected to the first-named input signal leads between the condensers and corresponding deflectors thereof.

18. The high potential filter condenser unit of claim 1, wherein the other lead of the output circuit from the condenser is connected to a grounded return lead of the cathode of the cathode ray tube, and biasing means are provided between the control grid of the tube and said cathode return lead for applying a negative bias to said control grid, said means comprising a rectifying means and a filter condenser shunted by a resistor, the negative terminal of the shunted condenser being connected with said control grid and the positive terminal with the cathode return lead, together with an additional resistor in series with said control grid.

EDWARD G. GAGE.